United States Patent
Hwang et al.

(10) Patent No.: US 11,028,907 B2
(45) Date of Patent: Jun. 8, 2021

(54) POWER TRANSMISSION APPARATUS FOR AN ELECTRIC VEHICLE

(71) Applicants: HYUNDAI MOTOR COMPANY, Seoul (KR); KIA MOTORS CORPORATION, Seoul (KR)

(72) Inventors: Jin Young Hwang, Yongin-si (KR); Jong Sool Park, Seongnam-si (KR); Jong Soo Kim, Seoul (KR); Sang Bum Baek, Seoul (KR); Jin Ho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 5 days.

(21) Appl. No.: 16/701,847

(22) Filed: Dec. 3, 2019

(65) Prior Publication Data
US 2021/0054910 A1    Feb. 25, 2021

(30) Foreign Application Priority Data
Aug. 23, 2019  (KR) .......................... 10-2019-0103501

(51) Int. Cl.
*F16H 3/66* (2006.01)
*F16H 57/08* (2006.01)
*B60L 50/50* (2019.01)

(52) U.S. Cl.
CPC .............. *F16H 3/666* (2013.01); *B60L 50/50* (2019.02); *F16H 57/082* (2013.01)

(58) Field of Classification Search
None
See application file for complete search history.

(56) References Cited

U.S. PATENT DOCUMENTS

| | | | |
|---|---|---|---|
| 7,101,309 B2 * | 9/2006 | Ozeki | B60K 6/48 477/3 |
| 7,426,971 B2 * | 9/2008 | Kano | B60K 6/365 180/65.25 |
| 7,690,455 B2 * | 4/2010 | Kano | B60K 6/405 180/65.235 |
| 8,246,499 B2 * | 8/2012 | Iwanaka | B60K 6/547 475/5 |

(Continued)

FOREIGN PATENT DOCUMENTS

JP    2009-061923 A    3/2009

*Primary Examiner* — Dirk Wright
(74) *Attorney, Agent, or Firm* — Brinks Gilson & Lione

(57) ABSTRACT

A power transmission apparatus for an electric vehicle including a motor as a power source may include: a compound planetary gear set formed as a combination of first and second planetary gear sets sharing a sun gear and a plurality first pinion gears; a first brake selectively connecting a first ring gear of the first planetary gear set to a transmission housing; and a second brake selectively connecting the shared sun gear of the first and second planetary gear sets to the transmission housing. In particular, a second ring gear of the second planetary gear set is fixedly connected to a rotor of the motor and thus continuously receives a torque of the motor, and the power transmission apparatus outputs a shifted torque through a planet carrier rotatably supporting the plurality of first pinion gears and a plurality of second pinion gears of the first planetary gear set.

17 Claims, 7 Drawing Sheets

(56) References Cited

U.S. PATENT DOCUMENTS

| | | | |
|---|---|---|---|
| 8,246,501 B2* | 8/2012 | Phillips | F16H 3/728 |
| | | | 475/5 |
| 8,414,436 B2* | 4/2013 | Holmes | B60K 6/365 |
| | | | 475/5 |
| 8,721,482 B2* | 5/2014 | Takami | B60K 6/445 |
| | | | 475/5 |
| 8,920,274 B2* | 12/2014 | Scholz | F16H 37/065 |
| | | | 475/5 |
| 9,234,565 B2 | 1/2016 | Zhang et al. | |
| 9,340,101 B2* | 5/2016 | Meißner | F16H 3/725 |
| 9,701,189 B2* | 7/2017 | Lee | B60K 6/365 |
| 10,471,818 B2* | 11/2019 | Oba | B60K 6/365 |
| 10,562,514 B2* | 2/2020 | Tsukada | B60K 6/44 |
| 10,889,175 B1* | 1/2021 | Hwang | B60K 6/38 |
| 2011/0245003 A1* | 10/2011 | Takami | B60K 6/445 |
| | | | 475/5 |

\* cited by examiner

POWER TRANSMISSION APPARATUS FOR AN ELECTRIC VEHICLE

CROSS-REFERENCE TO RELATED APPLICATION

This application claims priority to and the benefit of Korean Patent Application No. 10-2019-0103501, filed on Aug. 23, 2019, the entire contents of which are incorporated herein by reference.

FIELD

The present disclosure relates to a power transmission apparatus for an electric vehicle.

BACKGROUND

The statements in this section merely provide background information related to the present disclosure and may not constitute prior art.

An environmentally-friendly technology of a vehicle has been considered as a core technology for a future automobile industry, and advanced car makers have focused their resources on the development of an environmentally-friendly vehicle to satisfy environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such future vehicle technology.

The electric vehicle (EV) has been mass-produced mainly in light vehicles or small-sized passenger vehicles, and electric vehicle (EV) mechanisms are further expanding to large-sized passenger vehicles and sports utility vehicles (SUV). In this regard, multiple stage transmissions for such an EV is investigated for improvement of electrical efficiency and dynamic performance of the EV, and also for reduction in weight and cost for the motor.

Regarding a power transmission apparatus for an electric vehicle (EV) or a hybrid electric vehicle (HEV), transmission efficiency in a reversal drive condition for regenerative braking during deceleration as well as a forward drive condition may be an important factor estimating a performance of the transmission.

A two-stage shifting, when compared with a single stage gear ratio, provides benefits of cost reduction and improved efficiency and performance of an EV.

However, we have discovered that when multi-stage shifting is implemented to an EV, a shift-shock increases as a step ratio increase, such that a shift-shock may cause potential damage to a friction element employed in a power transmission apparatus of the EV or HEV.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus for an electric vehicle having advantages of efficiency of multi-stages and enhanced durability.

An exemplary power transmission apparatus is for an electric vehicle including a motor as a power source. In one form of the present disclosure, the power transmission apparatus may include: a compound planetary gear set formed as a combination of first and second planetary gear sets sharing a sun gear and a plurality first pinion gears; a first brake selectively connecting a first ring gear of the first planetary gear set to a transmission housing; and a second brake selectively connecting the shared sun gear of the first and second planetary gear sets to the transmission housing. In one form, a second ring gear of the second planetary gear set may be fixedly connected to a rotor of the motor and may always receive a torque of the motor. The power transmission apparatus may output a shifted torque through a planet carrier rotatably supporting the plurality of first pinion gears and a plurality of second pinion gears of the first planetary gear set.

In one form, the first planetary gear set may be a double pinion planetary gear set including the sun gear and the plurality of first pinion gears shared with the second planetary gear set, a plurality of second pinion gears, and the first ring gear. The second planetary gear set may be a single pinion planetary gear set including the sun gear and the plurality of first pinion gears shared with the first planetary gear set, and the second ring gear.

In another form, the plurality of first pinion gears may be externally engaged with the sun gear. Each of the plurality of second pinion gears may be externally engaged with two adjacent first pinion gears among the plurality of first pinion gears. The planet carrier rotatably may support the plurality of first pinion gears and the plurality of second pinion gears. The plurality of second pinion gears may be internally engaged with the first ring gear.

In another form, the plurality of first pinion gears may be internally engaged with the second ring gear of the second planetary gear set.

In other form, the plurality of first pinion gears may be formed as three first pinion gears, and the plurality of second pinion gears may be formed as three second pinion gears. The plurality of first pinion gears may be formed as four first pinion gears, and the plurality of second pinion gears may be formed as four second pinion gears.

In one aspect of the present disclosure, the plurality of first pinion gears may be formed as five first pinion gears, and the plurality of second pinion gears may be formed as five second pinion gears. The plurality of first pinion gears are formed as six first pinion gears, and the plurality of second pinion gears may be formed as six second pinion gears.

In another aspect of the present disclosure an exterior circumference of the second ring gear may be fixedly connected to the rotor of the motor.

In other form, the planet carrier may be fixedly connected to an output gear.

In an exemplary power transmission apparatus for an electric vehicle, first and second planetary gear sets sharing a sun gear, first pinion gears, and a planet carrier are combined to form a compound planetary gear set, and each second pinion gear of the first planetary gear set of a double pinion planetary gear set is engaged with two adjacent first pinion gears. Therefore, torque transmission delivery efficiency and durability may be excellent, and simultaneously, the power transmission apparatus may be more compact in size.

In particular, forces applied to the first and second pinion gears may be cancelled, thereby decreasing load and stress of the pinion gears, and therefore, torque transmission delivery efficiency and durability may be improved.

Such a scheme does not have difference in directionality, i.e., difference between forward driving and rearward driving, thereby showing sufficient efficiency in both directions. Furthermore, a sun gear and a planet carrier is shared by first and second planetary gear sets, and therefore, the size or length of the power transmission apparatus may be decreased.

Further, effects that can be obtained or expected from exemplary embodiments of the present disclosure are directly or suggestively described in the following detailed description. That is, various effects expected from exemplary embodiments of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
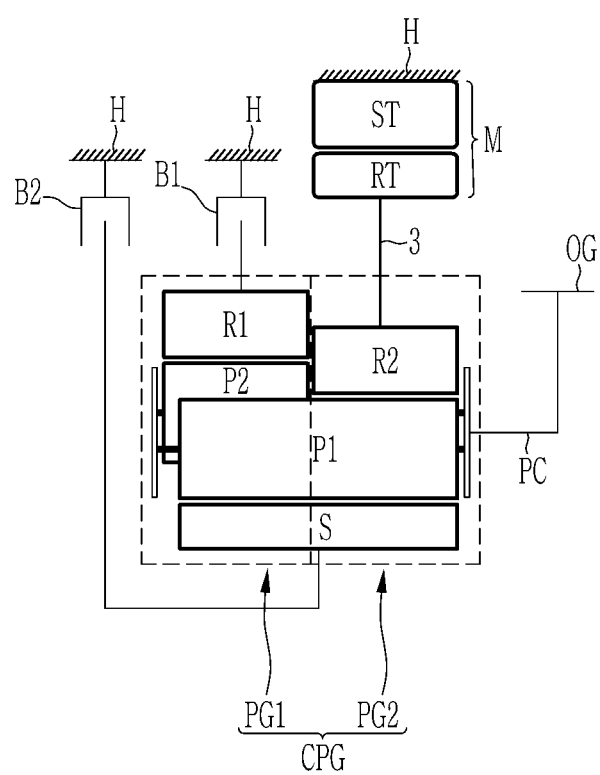
FIG. 1 is a schematic view of a power transmission apparatus for an electric vehicle according to an exemplary embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

In the following description, dividing names of components into first, second and the like is to divide the names because the names of the components are the same as each other and an order thereof is not particularly limited.

FIG. 1 is a schematic view of a power transmission apparatus for an electric vehicle according to an exemplary embodiment of the present disclosure.

Referring to FIG. 1 the power transmission apparatus for an electric vehicle receives a torque from a motor M as a power source, and outputs a shifted torque. The exemplary power transmission apparatus may include a compound planetary gear set CPG and first and second brakes B1 and B2.

The motor M as the power source acts as a typical drive motor, and includes a stator fixed to a motor housing and a rotor rotatably supported within the stator.

The compound planetary gear set CPG may be formed as a combination of first and second planetary gear sets PG1 and PG2 sharing a sun gear S and a plurality of first pinion gears P1.

In more detail, the first planetary gear set PG1 of the compound planetary gear set CPG is formed as a double pinion planetary gear set that includes the shared sun gear S, the plurality of shared first pinion gears P1, a plurality of second pinion gears P2, and a first ring gear R1. The second planetary gear set PG2 of the compound planetary gear set CPG is formed as a single planetary gear set that includes the shared sun gear S, the plurality of shared first pinion gear P1, and a second ring gear R2.

The sun gear S shared by the first and second planetary gear sets PG1 and PG2 is located at a rotation axis of the first and second planetary gear sets PG1 and PG2. The plurality of shared first pinion gears P1 are externally gear-meshed with the shared sun gear S. The plurality of second pinion gears P2 are externally gear-meshed with the shared first pinion gears P1. In more detail, each of the second pinion gears P2 is externally gear-meshed with both adjacent first pinion gears P1, which is clearly understood in FIG. 2A to FIG. 2D.

The compound planetary gear set CPG further includes a planet carrier PC that rotatably supports the first and second pinion gears P1 and P2. That is, the planet carrier PC is also shared by the first and second planetary gear sets PG1 and PG2.

The first ring gear R1 is internally gear-meshed with the plurality of the second pinion gears P2.

The second ring gear R2 is internally gear-meshed with the plurality of the first pinion gears P1.

FIG. 2A to FIG. 2D are schematic diagrams of a planetary gear set applied to a power transmission apparatus for an electric vehicle according to an exemplary embodiment of the present disclosure.

Figure 2A:
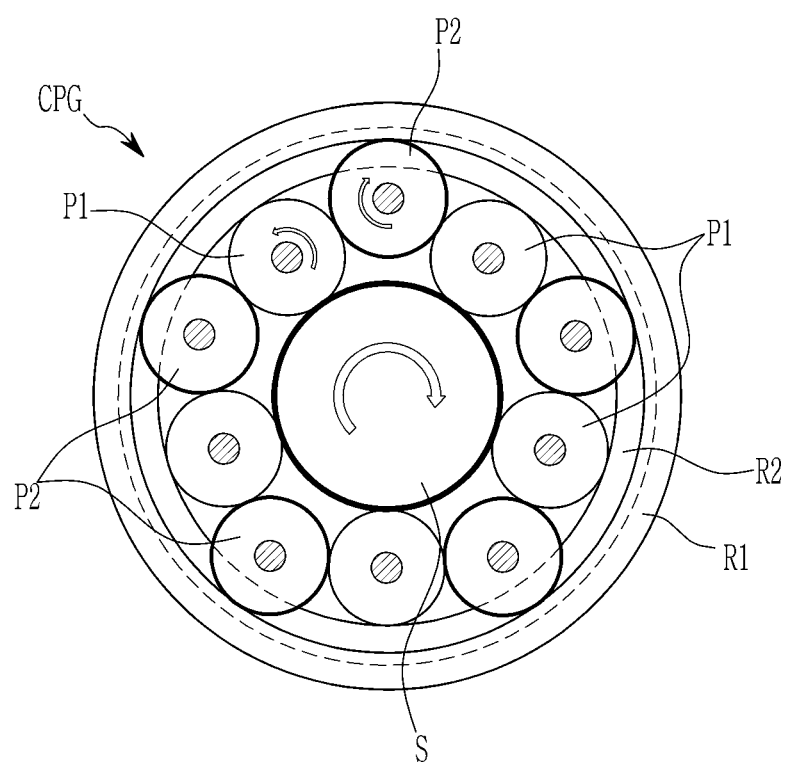
FIGS. 2A, 2B, 2C and 2D are schematic diagrams respectively illustrating a planetary gear set applied to a power transmission apparatus for an electric vehicle according to an exemplary embodiment of the present disclosure.
Figure 2B:
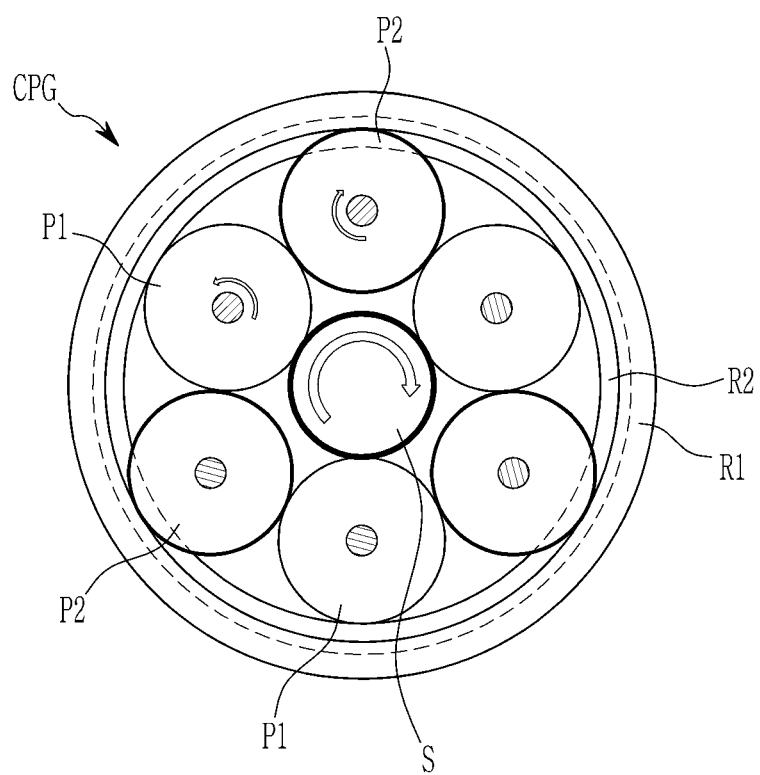
Figure 2C:
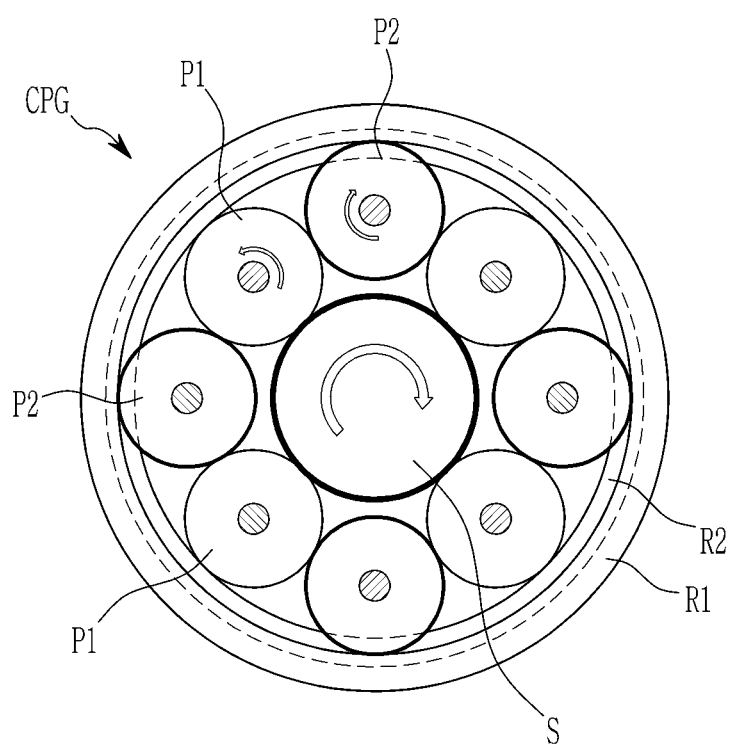
Figure 2D:
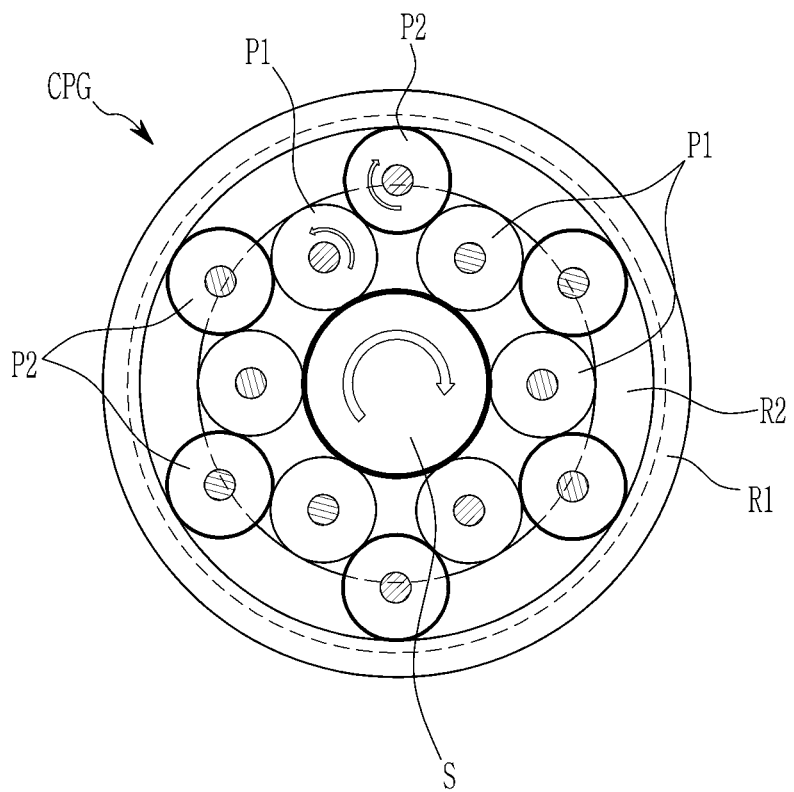

Referring to FIG. 2A, the plurality of first pinion gears P1 and the plurality of second pinion gears P2 are respectively illustrated as five first pinion gears and five second pinion gears. However, it may be understood that the present disclosure is not limited thereto, and the number of the first and second pinion gears P1 and P2 may be formed in different numbers, while each second pinion gear is gear-meshed with two adjacent first pinion gears. For example, FIG. 2B illustrates that three first pinion gears P1 and three second pinion gears P2 are employed, FIG. 2C illustrates that four first pinion gears P1 and four second pinion gears P2 are employed, and FIG. 2D illustrates that six first pinion gears P1 and six second pinion gears P2 are employed. It may be understood that the number of first pinion gears P1 and second pinion gears P2 may contribute to variation of an available gear ratio.

An exterior circumference of the second ring gear R2 of the second planetary gear set PG2 is fixedly connected to the rotor RT of the motor M through a hub 3, and thereby, the torque of the motor M is fixedly input to the second ring gear R2.

The planet carrier PC is fixedly connected to an output gear OG, and outputs a shifted torque of two stages according to an operation of the compound planetary gear set CPG.

The first brake B1 selectively interconnects the first ring gear of the first planetary gear set PG1 to the transmission housing H, and the second brake B2 selectively interconnects the shared sun gear S of the first and second planetary gear sets PG1 and PG2 to the transmission housing H.

The engagement elements of the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

That is, in the compound planetary gear set CPG, the second ring gear R2 of the second planetary gear set PG2 always receives the torque of the motor M by being fixedly connected to the rotor RT of the motor M. In addition, a shifted torque is output through the shared planet carrier PC rotatably supporting the first and second pinion gears P1 and P2.

Figure 3:
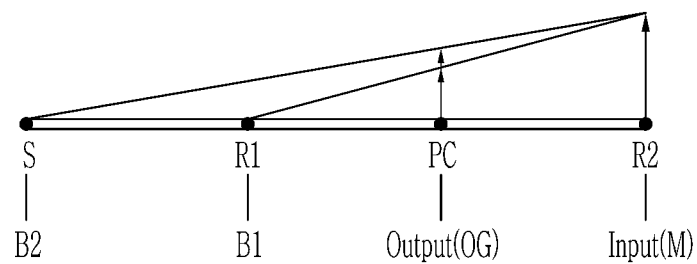
FIG. 3 is a shift diagram of a power transmission apparatus for an electric vehicle according to an exemplary embodiment of the present disclosure.

FIG. 3 is a shift diagram of a power transmission apparatus for an electric vehicle according to an exemplary embodiment of the present disclosure.

Referring to FIG. 3, a power transmission apparatus for an electric vehicle according to an exemplary embodiment of the present disclosure realizes two stages in an electric vehicle (EV) mode, as follows.

[EV Mode Forward First Speed and Reverse Speed]

In the EV mode forward first speed, the first brake B1 is operated, as shown in FIG. 3.

Accordingly, the torque of the motor M is input to the second ring gear R2, and the first ring gear R1 acts as a fixed element by the operation of the first brake B1. Therefore, a decreased speed is output through the planet carrier PC, and forms a forward first speed.

When the motor M is rotated in a reverse direction, a reverse speed may be realized with a same torque and gear ratio with the forward first speed.

[EV Mode Forward Second Speed]

In the EV mode forward second speed, the second brake B2 is operated, as shown in FIG. 3.

Accordingly, the torque of the motor M is input to the second ring gear R2, and the sun gear S acts as a fixed element by the operation of the second brake B2. Therefore, a decreased speed is output through the planet carrier PC, and forms a forward second speed. From FIG. 3, it may be understood that the forward second speed is higher than the forward first speed.

For two-stage shifting by a power transmission apparatus for an electric vehicle, the number of teeth of the sun gear S may be 30, the number of teeth of the first ring gear R1 may be 90, and the number of teeth of the second ring gear R2 may be 100. In this case, the gear ratio for the forward first speed may become 2.0, and the gear ratio of the forward second speed may become 1.3. Therefore, a step ratio between the forward first and second speed becomes 1.538, which implies that a shift-shock may be reduced or minimized.

Figure 4:
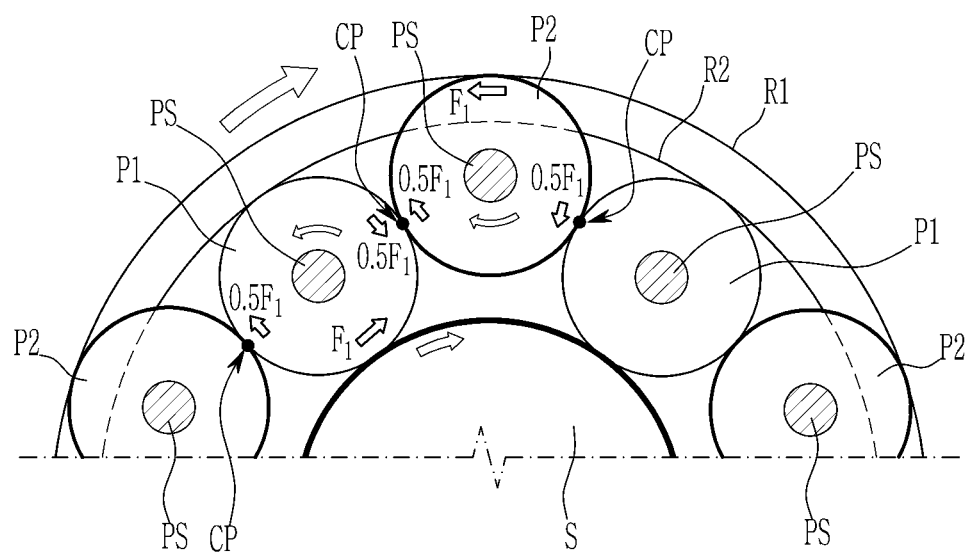
FIG. 4 is a schematic diagram illustrating force relationship acting on the first and second pinion gears of the compound planetary gear set employed in an exemplary power transmission apparatus for an electric vehicle.

FIG. 4 illustrates force relationship acting on the first and second pinion gears of the compound planetary gear set employed in an exemplary power transmission apparatus for an electric vehicle.

In an exemplary power transmission apparatus for an electric vehicle, first and second planetary gear sets PG1 and PG2 sharing a sun gear S, first pinion gears P1, and a planet carrier PC are combined to form a compound planetary gear set CPG, and each second pinion gear P2 of the first planetary gear set PG1 of a double pinion planetary gear set is engaged with two adjacent first pinion gears P1.

Accordingly, as shown in FIG. 4, a force $F_1$ applied to the first and second pinion gears P1 and P2 in a circumferential direction, i.e., the force $F_1$ applied to the first pinion gear P1 by the sun gear S and the force $F_1$ applied to the second pinion gear P2 by the first ring gear R1, may be cancelled by a force of interaction between the first and second pinion gears P1 and P2. Therefore, durability of pinion gears may be improved.

In an exemplary power transmission apparatus for an electric vehicle, adjacent first and second pinion gears P1 and P2 form an engagement point CP, and thereby the power transmission apparatus becomes symmetrical with respect to any of the first and second pinion gears P1 and P2. Therefore, there is not any directionality, i.e., any difference between forward driving and rearward driving, and therefore, power transmission efficiency may be maintained excellent at a rearward driving, thereby decreasing power loss.

According to an exemplary power transmission apparatus for an electric vehicle, a sun gear and a planet carrier is shared by first and second planetary gear sets, and therefore, the size or length of the power transmission apparatus may be decreased.

While this present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

DESCRIPTION OF SYMBOLS

M: motor
B1,B2: first and second brakes
OG: output gear
CPG: compound planetary gear set
PG1, PG2: first and second planetary gear sets
H: transmission housing

What is claimed is:

1. A power transmission apparatus for an electric vehicle including a motor as a power source, the power transmission apparatus comprising:
    a compound planetary gear set formed as a combination of first and second planetary gear sets sharing a sun gear and a plurality of first pinion gears;
    a first brake selectively connecting a first ring gear of the first planetary gear set to a transmission housing; and
    a second brake selectively connecting the shared sun gear of the first and second planetary gear sets to the transmission housing,
    wherein a second ring gear of the second planetary gear set is fixedly connected to a rotor of the motor and configured to continuously receive a torque of the motor, and
    wherein the power transmission apparatus outputs a shifted torque through a planet carrier rotatably supporting the plurality of first pinion gears and a plurality of second pinion gears of the first planetary gear set.

2. The power transmission apparatus of claim 1, wherein:
    the first planetary gear set is a double pinion planetary gear set including the shared sun gear and the plurality of first pinion gears shared with the second planetary gear set, a plurality of second pinion gears, and the first ring gear; and
    the second planetary gear set is a single pinion planetary gear set including the shared sun gear and the plurality of first pinion gears shared with the first planetary gear set, and the second ring gear.

3. The power transmission apparatus of claim 2, wherein:
the plurality of first pinion gears are externally engaged with the shared sun gear;
each of the plurality of second pinion gears is externally engaged with two adjacent first pinion gears among the plurality of first pinion gears;
the planet carrier rotatably supports the plurality of first pinion gears and the plurality of second pinion gears; and
the plurality of second pinion gears are internally engaged with the first ring gear.

4. The power transmission apparatus of claim 3, wherein the plurality of first pinion gears are internally engaged with the second ring gear of the second planetary gear set.

5. The power transmission apparatus of claim 4, wherein the plurality of first pinion gears are formed as three first pinion gears, and the plurality of second pinion gears are formed as three second pinion gears.

6. The power transmission apparatus of claim 4, wherein the plurality of first pinion gears are formed as four first pinion gears, and the plurality of second pinion gears are formed as four second pinion gears.

7. The power transmission apparatus of claim 4, wherein the plurality of first pinion gears are formed as five first pinion gears, and the plurality of second pinion gears are formed as five second pinion gears.

8. The power transmission apparatus of claim 4, wherein the plurality of first pinion gears are formed as six first pinion gears, and the plurality of second pinion gears are formed as six second pinion gears.

9. The power transmission apparatus of claim 4, wherein an exterior circumference of the second ring gear is fixedly connected to the rotor of the motor.

10. The power transmission apparatus of claim 3, wherein the planet carrier is fixedly connected to an output gear.

11. A power transmission apparatus for an electric vehicle including a motor as a power source, the power transmission apparatus comprising:
a first planetary gear set formed as a double pinion planetary gear set including a sun gear, a plurality of first pinion gears externally engaged with the sun gear, a plurality of second pinion gears externally engaged with the plurality of first pinion gears, each of the second pinion gears being externally engaged with two first pinion gears among the plurality of first pinion gears and disposed angularly both sides, a planet carrier rotatably supporting the plurality of first pinion gears and the plurality of second pinion gears, and a first ring gear internally engaged with the plurality of second pinion gears;
a second planetary gear set formed as a single pinion planetary gear set including the sun gear shared with the first planetary gear set, the plurality of first pinion gears shared with the first planetary gear set, the planet carrier shared with the first planetary gear set, and a second ring gear internally engaged with the plurality of first pinion gears and fixedly connected to a rotor of the motor;
a first brake selectively connecting a first ring gear of the first planetary gear set to a transmission housing; and
a second brake selectively connecting the shared sun gear of the first and second planetary gear sets to the transmission housing,
wherein the first and second planetary gear sets are combined to form a compound planetary gear set, and
wherein the power transmission apparatus outputs a torque through the planet carrier.

12. The power transmission apparatus of claim 11, wherein the plurality of first pinion gears are formed as three first pinion gears, and the plurality of second pinion gears are formed as three second pinion gears.

13. The power transmission apparatus of claim 11, wherein the plurality of first pinion gears are formed as four first pinion gears, and the plurality of second pinion gears are formed as four second pinion gears.

14. The power transmission apparatus of claim 11, wherein the plurality of first pinion gears are formed as five first pinion gears, and the plurality of second pinion gears are formed as five second pinion gears.

15. The power transmission apparatus of claim 11, wherein the plurality of first pinion gears are formed as six first pinion gears, and the plurality of second pinion gears are formed as six second pinion gears.

16. The power transmission apparatus of claim 11, wherein an exterior circumference of the second ring gear is fixedly connected to the rotor of the motor.

17. The power transmission apparatus of claim 11, wherein the planet carrier is fixedly connected to an output gear.

* * * * *